July 24, 1956

R. J. KUTZLER 2,756,010

AUTOMATIC PILOTS

Filed Feb. 23, 1951

Inventor
ROBERT J. KUTZLER
George H Fisher
Attorney

July 24, 1956

R. J. KUTZLER 2,756,010

AUTOMATIC PILOTS

Filed Feb. 23, 1951

Inventor
ROBERT J. KUTZLER
George H Fisher
Attorney

United States Patent Office 2,756,010
Patented July 24, 1956

2,756,010
AUTOMATIC PILOTS

Robert J. Kutzler, Minneapolis, Minn., assignor to Minneapolis-Honeywell Regulator Company, Minneapolis, Minn., a corporation of Delaware Application February 23, 1951, Serial No. 212,345

10 Claims. (Cl. 244—77)

This invention pertains to apparatus for manually or automatically controlling the attitude of dirigible craft such as airplanes and the like. The invention specifically pertains to the control of aircraft commonly known as the Flying Wing. This form of aircraft has two control surfaces known as elevons movable in the same direction to change the pitch attitude of the craft and alternatively movable in opposite directions, to change the roll attitude of the craft along with a second pair of rudder control surfaces.

It is an object of this invention to provide a improved apparatus for the control of a Flying Wing aircraft.

Another object of this invention is to control the attitude of such aircraft automatically about a plurality of axes in such a manner that abrupt deflections of said control surfaces is avoided.

It is a further object of this invention to provide control apparatus for such aircraft which permits operation of said control surfaces automatically or manually in such manner that shifting from manual to automatic operation is accomplished without abrupt change in attitude of said craft.

Automatic control apparatus for this form of aircraft have included arrangements for operating the rudder control surfaces thereof in sequence.

A further object of this invention is to provide a novel arrangement for sequentially operating the rudders of said craft.

It is a further object of this invention to utilize a condition responsive device for automatically controlling said craft with improved arrangements for returning said device to a normal position during such period when its operation is not utilized.

A further object of the invention is to provide improved apparatus embodying novel features adapted for use in realizing the above objects and also adapted for use in other fields.

These and further objects of the invention will become apparent upon consideration of the following description taken in conjunction with the accompanying drawings wherein.

The invention for the purpose of illustration has been applied to an automatic control system for a Flying Wing type of aircraft. The Flying Wing aircraft is controlled about its lateral or pitch axis and about its roll axis by one set of control surfaces termed elevons. When the elevons are moved in the same direction they control the aircraft about the lateral axis and therefore serve a function similar to elevators for the conventional aircraft. When the elevons are moved in opposite directions the aircraft moves about its longitudinal or roll axis and thus the elevons in this operation perform the same function as the ailerons in a conventional aircraft. The flying wing is controlled about its vertical or turn axis by a pair of rudders, there being one rudder arranged in the trailing edge of each wing. As a rudder is opened, it increases the drag on that particular wing and causes the aircraft to move about the turn axis. It is desirable that only one rudder be displaced from a normal position at any time in order to reduce the over-all drag on the aircraft. It is to be understood that the elevon and rudder control surfaces may be manually operated or automatically operated.

Figure 1A:
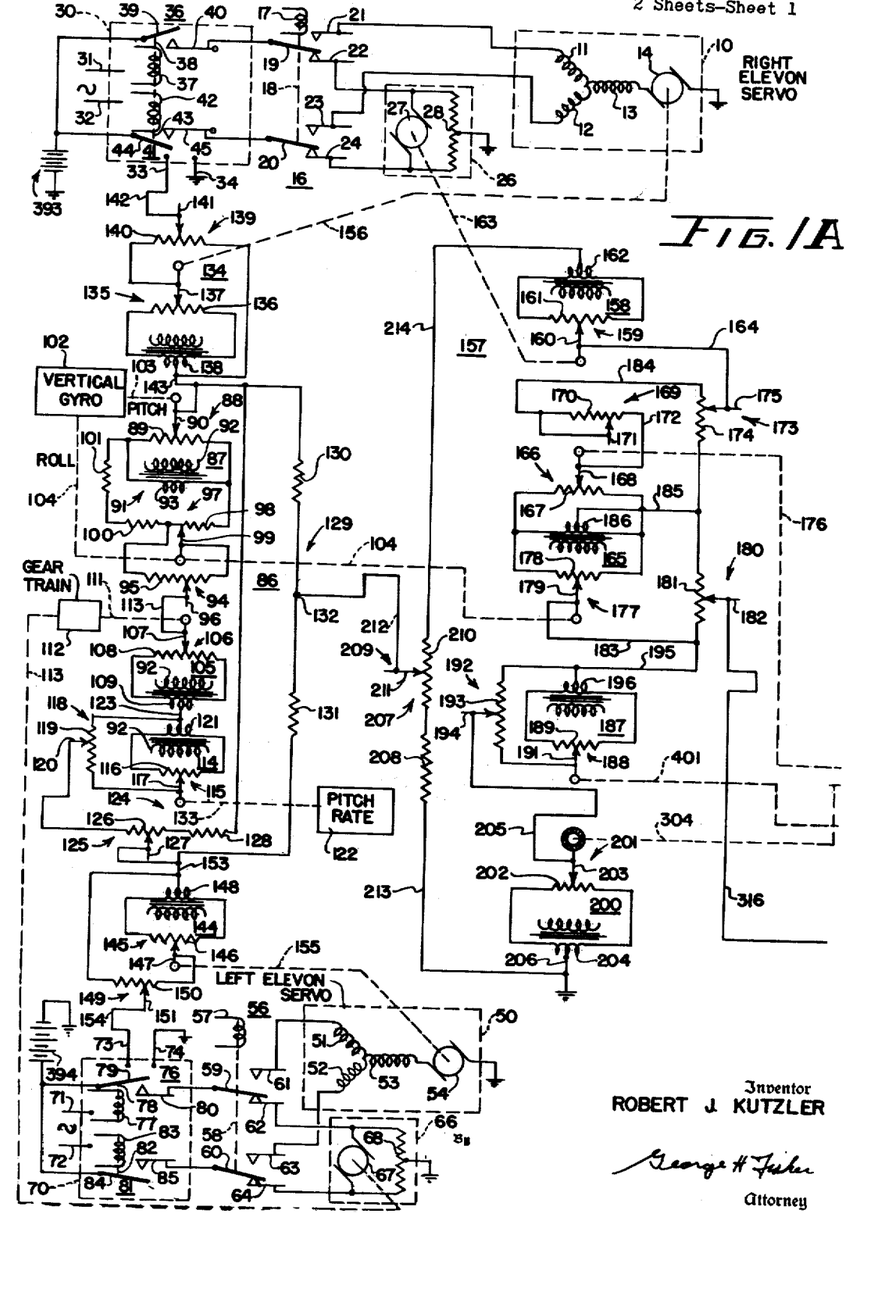
Figures 1a and 1b together constitute a schematic automatic control apparatus for an aircraft for controlling said craft about its three conventional axes, namely the turn, roll, and pitch axes.
Figure 1B:
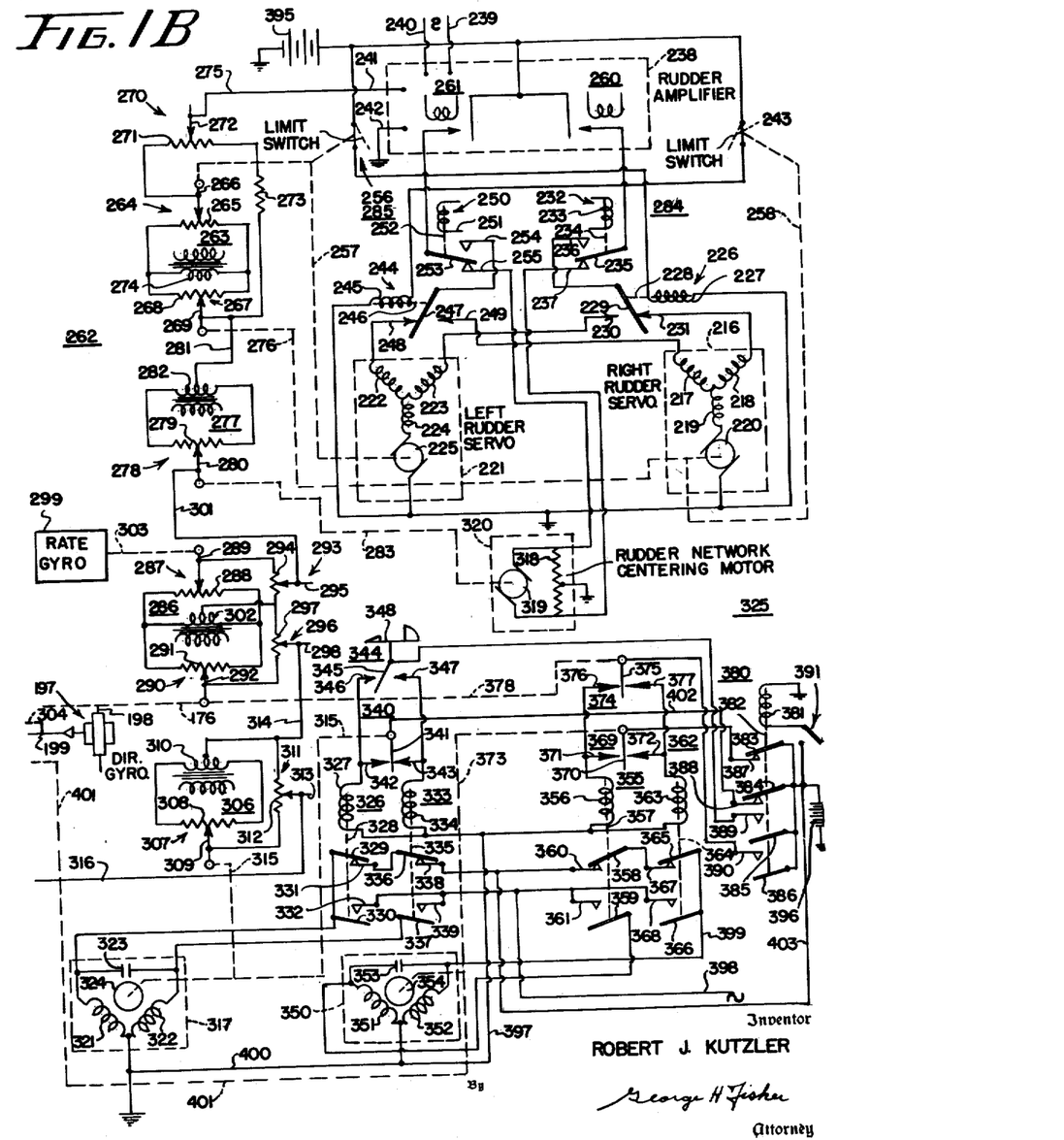

Referring to the drawing, the right elevon (not shown) is adapted to be positioned by a right elevon servomotor 10. The servomotor 10 is reversibly controlled from a right elevon servomotor amplifier 30 through a right elevon engage relay 16. The left elevon (not shown) is positioned by a left elevon servomotor 50. The left elevon servomotor is reversibly controlled from a left elevon servomotor amplifier 70 through a left elevon servomotor engage relay 56. The right and left amplifiers are controlled jointly by a network 86 during elevator action of the servomotors. The amplifiers are also controlled by a network 157 during aileron action of the servomotors. The elevator action network is controlled from a vertical flight gyro 102 to stabilize the aircraft about the lateral axis. The aileron action network is controlled by this vertical flight gyroscope upon movement about a second axis perpendicular to the lateral axis to stabilize the aircraft about the roll axis.

The rudders for controlling the aircraft about the turn axis are not shown but the right rudder is adapted to be positioned by a right rudder servomotor 216, and the left rudder is adapted to be positioned by a left rudder servomotor 221. The right and left servomotors are sequentially controlled through a right rudder servomotor engage relay 284, a left rudder servomotor engage relay 285, and limit switches 243, 256.

The rudder amplifier is controlled by a balanceable variable impedance network 262. This network, upon deviation of the aircraft about the turn axis during automatic control is operated by a directional gyro 197 to correct for deviations of the craft about the turn axis.

The Flying Wing aircraft has less directional stability than the conventional aircraft, that is to say its direction of movement may be angularly displaced from its direction of heading. To increase its directional stability, a vane 348 responsive to the angular difference between the heading of the aircraft and the direction of the relative air, which condition is known as yaw, controls through a yaw reset motor 317 the rudder network 262 to affect operation of the rudder servomotors to remove the yaw and maintain directional stability.

When the directional instability is corrected by causing the aircraft to head in the direction in which the air is moving relative to the aircraft, this change in heading of the aircraft results in a turn about the turn axis. In order to again return the aircraft on the desired heading, the directional gyroscope 197, through a direction reset motor 350, controls the rudder network 325 and the aileron action network 157 whereby the aircraft is placed in a banked turn and brought again to the original heading.

Selective changes in the heading of the aircraft are made by a manually operable controller 203 which controls the aileron action network 157 and the rudder network 262 so that changes in heading are made by banked turns. During such selective changes in heading, the directional gyro 197 is maintained in a caged and centered condition.

Since, as stated, the elevon and rudder control surfaces may be manually positioned, such positioning of the control surfaces will cause the aircraft to assume various attitudes about its respective axes. During such changes in attitude due to the operation of the control surfaces manually, the elevator action network 86, the aileron action network 157, and the rudder network 262 would be operated or unbalanced by their respective gyroscopes as will more fully appear. It is apparent that in these changes in attitude, the respective networks have been unbalanced and if automatic control be resorted to the aircraft would not remain on the attitude assumed due to manual positioning of the control surfaces but would violently return to the attitude dictated by the respective gyroscopes.

While it is possible to cage the directional gyroscope during such changes in attitude about the turn axis, it has been found desirable additionally to compensate the various networks due to the operation of the gyroscopes. This compensation is provided in the aileron action network by an aileron centering motor 26; in the elevator action network by an elevator centering motor 66; and in the rudder network by a rudder centering motor 320.

When the control surfaces are manually positioned the various engage relays are in unenergized condition as shown. At this time the respective centering motors are connected through the unenergized engage relays to the right elevon amplifier 30, the left elevon amplifier 70 and the rudder amplifier 238. Any action of the vertical gyro 102 on the elevator action network results in the operation of the elevator centering motor 66 to compensate the elevator action network therefor. Any action due to the change in attitude of the craft during manual positioning of the control surfaces about the roll axis and applied to the aileron action network 157 by the vertical gyro 102 results in operation of the aileron centering motor 26 to introduce into the aileron action network a compensating effect. The effect on the rudder network 262 by movement of the vertical gyro about the roll axis results in the operation of the rudder centering motor 320 from the rudder amplifier 238 to introduce in the rudder network 262 a compensating effect.

Thus upon the change over from manual operation of the control surfaces to automatic positioning of the control surfaces by the servomotors, the aircraft will be maintained in the attitude which it had assumed due to the manual operation of the control surfaces.

The details of the components included in the apparatus will now be described. The right elevon servomotor 10 is a reversible direct current intermittently operated type having a forward rotation field winding 11, a reverse rotation field winding 12, a pulsing clutch winding 13, and an armature 14. The winding 13 and armature 14 are connected in series and one end of coil 13 is connected to the junction of coils 11 and 12. The servomotor may be also of the type disclosed in the patent to Hamby 2,466,702 having a continuously operated motor and intermittently operated clutch windings.

The right elevon servomotor engage relay 16 is of the double pole double throw single make type. Relay 16 consists of an operating coil 17 for operating a pull rod 18 which actuates relay arms 19, 20. The arms 19 and 20 coact respectively with in contact 21, out contact 22; in contact 23 and out contact 24 respectively. The aileron action centering motor 26 is of the direct current reversible type having permanent magnet fields (not shown) and a reversibly energized armature 27. A resistor 28 having a grounded center tap is connected across the armature 27.

The right elevon servo amplifier 30 may be of the type disclosed in the application of W. H. Gille et al. 2,425,733. This amplifier comprises a pair of power input terminals 31, 32; signal input terminals 33, 34; and amplifier operated relays 36, 41. For a simplified arrangement of amplifier 30 over that disclosed in Patent 2,425,733 above, relays 36 and 41 are illustrated as of the single pole single throw type. Relay 36 comprises an operating winding 37, a pull rod 38, which actuates a relay arm 39 into engagement with an in contact 40. Relay 41 comprises an operating winding 42, a pull rod 43, a relay arm 44, and an in contact 45. The relay windings 37 and 42 are operated in discriminator fashion depending upon the phase relationship of the signal voltage across terminals 33, 34 with respect to the voltage across power terminals 31, 32.

The left elevon servomotor 50 is similar to the right elevon servomotor 10 and comprises a forward rotation field winding 51, a reverse rotation field winding 52, a pulsing clutch winding 53, and an armature 54.

The left elevon servomotor engage relay 56 is of the double pole, double throw, single make type comprising an operating winding 57, a pull rod 58, operable arms 59, 60 and in contacts 61, 63 and out contacts 62, 64.

The elevator action centering network motor 66 is of the direct current permanent magnet field and reversibly energized armature type. The motor includes an armature 67 and a resistor 68 which resistor is connected across the armature 67 and includes a grounded center tap.

The left elevon servomotor amplifier 70 is similar to the amplifier 30 and comprises alternating current power input terminals 71, 72; alternating current signal input terminals 73, 74; amplifier relays 76 and 81. The relays 76 and 81 are operated in discriminator fashion in accordance with the phase relationship of the alternating voltage across signal input terminals 73, 74 with respect to the alternating voltage across power terminals 71, 72. Relay 76 comprises an operating winding 77, a pull rod 78, a relay arm 79, and an in contact 80. Relay 76 is thus of the single pole, single throw type. Relay 81 is a single pole, single throw type and comprises an operating winding 83, a pull rod 82, a relay arm 84, and an in contact 85. The operation of the right and left elevon servomotor amplifiers 30 and 70 may be initiated from the elevator action network 86 or the aileron action network 157.

The elevator action network 86 comprises a plurality of signal voltage generating devices. One such signal generating device is a craft pitch-craft roll up elevator variable impedance network 87; a second is a craft trim or centering network 105; and a third is a craft pitch rate network 114. Network 87 comprises a craft pitch potentiometer 88; a craft roll potentiometer 97; a roll coordination potentiometer 94; a transformer 91; a balance resistor 100; and a balance resistor 101. Potentiometer 88 includes a resistor 89 which is connected across a secondary winding 93 of transformer 91. A slider 90 of potentiometer 88 is adjusted with respect to resistor 89 in accordance with the movement of the aircraft about the lateral or pitch axis. Slider 90 is for this purpose adjusted from a vertical flight gyroscope 102 through an operating connection 103.

The vertical gyro 102 is of the conventional type having a rotor with three degrees of angular freedom with its spin axis in a vertical direction with respect to the earth's surface and suitably supported so that it is rotatable about two horizontal respectively perpendicular axes. The gyroscope is so mounted in the aircraft that upon movement of the craft about the pitch axis the stabilized slider 90 moves with respect to the resistor 89 carried by the craft. Potentiometer 97 includes a resistor 98 which has one end connected to one end of secondary winding 93 and has its other end connected through resistors 100 and 101 in series to the opposite end of the secondary winding 93. Slider 99 of potentiometer 97 is adjusted from the vertical gyro 102 through an operating connection 104 in accordance with the movements of the aircraft about the roll axis. The operating connection 104 is such that slider 99 is moved from the position shown toward the right upon movement of the craft in either direction about the roll axis. Potentiometer 94 includes a resistor 95 having one end connected to slider 99 and the other end connected to the junction between resistor 100 and resistor 98 of potentiometer 97 and further includes a manually adjustable tap 96. Transformer 91 includes a primary winding 92 which is energized from a suitable source of alternating current such as the ship's supply.

Centering network 105 comprises a potentiometer 106 having a resistor 108 which is connected across the ends of a secondary winding 109 of a transformer. In the present apparatus, a plurality of secondary windings are supplied from a single primary winding therefore network 105 includes the same primary winding 92 as network 87. The slider 107 is driven from a gear train 112 from an output shaft 111. The gear train 112 includes an input shaft 113 driven from the centering motor 66. A lead wire extends from slider 107 to adjustable tap 96 of potentiometer 94.

Pitch rate network 114 includes a rate gyro potentiometer 115 and a rate coordination potentiometer 118. Potentiometer 115 includes a resistor 116 which is connected across the ends of a secondary winding 121 of the transformer 91 and a slider 117 positioned in respect to resistor 116 in accordance with the rate of pitch of the aircraft about the lateral axis. Potentiometer 118 includes a resistor 119 having one end connected to a center tap of secondary winding 121 and its other end connected to slider 117. Potentiometer 118 includes a manually adjustable tap 120. A lead wire 123 extends from a center tap of secondary winding 109 of network 105 to a center tap of secondary winding 121.

Slider 117 is positioned by means of an operating connection 133 from a pitch rate gyroscope 122. The pitch rate gyroscope 122 may be of a conventional type having a rotor with two degrees of angular freedom with the further limitation that its rotation about one of these axes is opposed by restraining means. The gyroscope 122 is so mounted on the aircraft that upon movement of the aircraft about its lateral axis the movement of slider 117 with respect to resistor 116 is in accordance with the rate of pitch of the aircraft.

The impedance networks 87, 105, and 114 are connected in series as is evident from the above description and the adjustable tap 120 and the vertical gyro adjusted slider 90 constitute the output terminals of the series connected impedances. Across the two output terminals 120, 90 there is connected a voltage divider 124. This voltage divider consists of an elevon ratio poteniometer 125 and a protective resistor 128. Potentiometer 125 comprises a resistor 126 having one end connected to tap 120 and its other end connected to one end of resistor 128. The opposite end of resistor 128 is connected to slider 90. Potentiometer 125 includes a manually adjusted tap 127 which together with the slider 90 now constitutes the over-all output members of network 86. Across the manually adjustable tap 127 and the slider 90 there is a fixed voltage divider 129. This voltage divider 129 consists of two equal resistances 130 and 131 connected in series with the free end of resistor 130 connected to slider 90 and the free end of resistor 131 connected to tap 127. A junction 132 is formed between resistors 130 and 131 and it is apparent that the potential of this junction with respect to the network 86 is midway between that of tap 127 and slider 90.

If we assume that junction 132 is at ground potential which is that of terminal 34 of amplifier 30 and terminal 74 of amplifier 70 it is evident that with a voltage across slider 90 and tap 127 signals of opposite phase will be applied to amplifiers 30 and 70.

The arrangement of the elevon amplifiers with respect to the elevon servomotors is such that upon the reception of signals of opposite polarity or phase by the amplifiers, the servomotors will rotate to position their elevons in the same direction.

Since it is desired that the elevon amplifier-elevon servomotor combinations may be of the closed loop or proportional type wherein the movement of the servomotor is proportional to the control signal applied to the amplifier, a servomotor rotation limit control network has been provided. This servomotor rotation limit control network may be referred to as a servomotor balance network. The input circuit of the right elevon amplifier 30 includes a balance network 134. This balance network 134 includes a right elevon balance potentiometer 135 and an elevon ratio potentiometer 139. Potentiometer 135 includes a resistor 136 connected across a secondary winding 138 of the transformer 91 and a slider 137. Potentiometer 139 includes a resistor 140 having one end connected to slider 137 and the other end connected to a center tap of secondary winding 138 and further includes a manually adjustable tap 141. A lead wire 142 extends from amplifier terminal 33 to tap 141, and a lead wire 143 extends from a center tap of secondary 138 to slider 90. Slider 137 of the rebalance potentiometer 135 is positioned with respect to resistor 136 through an operating connection 156 by the right elevon servomotor 10. By this means, the voltage between junction 132 and slider 90 may be balanced by the voltage between the center tap of winding 138 and adjustable tap 141.

The left amplifier 70 similarly has a rebalanced network 144. Network 144 comprises a left elevon balance potentiometer 145, an elevon ratio potentiometer 149, and a loading resistor 152. Potentiometer 145 has a resistor 146 which is connected across the ends of a secondary winding 148 of the transformer and an adjustable slider 147. The ratio potentiometer 149 has a resistor 150 having one end thereof connected to slider 147 and its other end connected to a center tap of secondary winding 148. Potentiometer 149 includes a manually adjustable tap 151 which is connected by lead 154 to input terminal 73 of amplifier 70. A lead wire 153 connects the center tap of secondary winding 148 to manually adjustable tap 127 of potentiometer 125. The left elevon balance potentiometer slider 147 is operated through an operating connection 155 from the left elevon servomotor 50 so that the potential between tap 151 and the center tap of secondary winding 148 balances the potential between adjustable tap 127 and junction 132.

Passing to the aileron action network 157, we observe that it comprises an aileron centering or trim network 158, a directional gyro bank—vertical gyro roll network 165, a direction reset network 187, and a manually operable selective turn network 200. Network 158 comprises a trim potentiometer 159 having a resistor 161 which is connected across the ends of a secondary winding 162 of the transformer and a slider 160 movable with respect to a resistor 161. The slider 160 is driven by the centering motor 26 through an operating connection 163.

Network 165 comprised a directional gyro banking potentiometer 166, a variable resistor 169, a banked limiting potentiometer 173, a vertical gyro roll potentiometer 177, and a turn control coordination potentiometer 180. Potentiometer 166 has a resistor 167 which is connected across the ends of a secondary winding 186 of the transformer. Potentiometer 166 includes a slider 168 which is positioned with respect to resistor 167 in accordance with deviations of the aircraft from a given heading maintained by direction gyroscope 197 to be described. Variable resistor 169 includes a resistor 170 and an adjustable tap 171. Bank limit potentiometer 173 includes a resistor 174 and an adjustable tap 175. One end of resistor 174 is connected by a lead wire 184 to one end of a variable resistor 170 whose opposite end is connected by lead wire 172 to slider 168. The opposite end of resistor 174 is connected by a lead wire 185 to a center tap of secondary winding 186. Potentiometer 177 includes a resistor 178 which is connected across the secondary winding 186 and a slider 179 adjusted with respect to resistor 178 in accordance with the movements of the aircraft about its roll axis. Potentiometer 180 includes a resistor 181 having one end connected to the center tap of secondary winding 186 and its opposite end connected by a lead wire 183 to slider 179 of potentiometer 177 and includes an adjustable tap 182.

Slider 168 as stated is positioned from a directional gyroscope 197 through an operating connection 176. The directional gyroscope 197 is of the conventional type having a rotor with three degrees of angular freedom.

The rotor is mounted for rotation about a horizontal spin axis and it is supported for movement about the horizontal axis at right angles to its axis of rotation. The movement about the latter horizontal axis is provided by a gimbal suspension which is in turn angularly movable about a vertical third axis 198 upon deviation in heading of the aircraft from a heading to be maintained by the gyroscope. The directional gyroscope 197 is provided with a centering and locking mechanism 199 to prevent movement of the operating connection 176 during manual selected turns to be described. This locking mechanism may be of the type disclosed in the application of William J. McGoldrick Serial No. 31,493 filed June 7, 1948.

The slider 179 of potentiometer 177 is positioned with respect to resistor 178 from the vertical gyroscope 102 by a suitable operating connection 104 upon movement of the aircraft about the roll axis.

The direction reset network 187 includes a potentiometer 188 and a voltage dividing potentiometer 192. Potentiometer 188 includes a resistor 189 which is connected across the ends of a secondary winding 196 of the transformer and an adjustable slider 191. The potentiometer 192 includes a resistor 193 having one end connected to a center tap of secondary winding 196 and its opposite end connected to slider 191 and a manually adjustable tap 194. A lead wire 195 extends from the center tap of secondary winding 196 and through the lead wire 183 connects the center tap with slider 179 of potentiometer 177. The slider 191 is positioned by means to be described as long as the aircraft heading deviates from a selected gyro heading.

Turn control network 200 comprises a manually adjustable turn control potentiometer 201 having a resistor 202 which is connected across the ends of a secondary winding 204 and a manually adjustable slider 203. A lead wire 205 extends from the adjustable tap 194 to the slider 203 and a center tap lead 206 of secondary winding 204 is connected to ground. The arrangement is such that upon operation of the manual turn control slider 203 the directional gyroscope 197 is centered and locked by operating means 304 or this arrangement may be like that disclosed in the aforesaid application of McGoldrick. It will now be seen that the impedances 158, 165, 187, and 200 are connected in series with the center tap of secondary winding 162 of network 158 and the grounded center tap lead 206 of secondary winding 204 constituting the output terminals of network 157.

Across the two output terminals there has been connected a variable voltage divider 207. Voltage divider 207 consists of an adjustable potentiometer 209 and a fixed resistor 208. Potentiometer 209 includes a resistor 210 and a manually adjustable tap 211. One end of resistor 210 is connected by lead 214 to the center tap of secondary winding 162. The other end of resistor 210 is connected to one end of the fixed resistor 208 whose opposite end is connected by lead 213 to the center tap lead 206 of secondary winding 204. A lead wire 212 extends from the adjustable tap 211 to the junction 132 of voltage divider 129.

By means of the voltage divider 207, voltages between the output terminals of network 157 may have a proportional amount applied to the junction 132. This proportional voltage is applied equally to elevon amplifiers 30 and 70 whereby the right and left elevon servomotors are caused to rate in opposite directions. The balance network 134 and 144 serve to limit the rotation of the right and left elevon servomotors by balancing the applied signal.

Consideration will now be given to the rudder control portion of the apparatus. The apparatus as stated is arranged to operate the left and right rudders of the aircraft. The right rudder (not shown) is positioned from a servomotor 216. The rudder servomotor is similar to the elevon servomotors and the motor 216 comprises a rudder opening winding 218, a rudder closing winding 217, a pulsing clutch winding 219, an armature 220. The left rudder (not shown) is positioned by a rudder servomotor 221 similar to motor 216 and comprises a rudder opening winding 222, a rudder closing winding 223, a pulsing clutch winding 224, and an armature 225. The right rudder servomotor 216 is controlled through a left servomotor limit switch relay 226 and a right rudder engage relay 232 from a rudder amplifier 238. The relay 226 is of the single pole, double throw type having an operating winding 227 and a pull rod 228 for actuating arm 229 which engages with an in contact 230 and an out contact 231.

Right rudder engage relay 232 is of the single pole double throw type having an operating winding 233 and a pull rod 234 for operating a relay arm 235 which coacts with an in contact 236 and an out contact 237.

Servomotor 216 is also controlled through a right servomotor limit switch relay 244 and a left rudder engage relay 250 from amplifier 238. Relay 244 comprises an operating coil 245, a pull rod 246, a relay arm 247, an out contact 248, and an in contact 249 and is thus of the single pole, double throw type.

Engage relay 250 is also of the single pole double throw type having an operating winding 251 which through a pull rod 252 operates an arm 253 which coacts with an in contact 254 and an out contact 255. The energization of winding 227 of limit switch relay 226 is controlled by a left rudder limit switch 256 which is operated through a suitable driving connection 257 from the left rudder servomotor 221. Switch 256 is of the single pole single throw normally open type and is moved to the closed position when the left rudder is returned to unoperated position and is automatically opened upon movement of the left rudder from unoperated position. The winding 245 of limit switch relay 244 is controlled from a right rudder servo limit switch 243. Switch 243 is of the type similar to switch 256 and is moved to a closed position as the right rudder approaches its unoperated position through a suitable driving connection 258. The relay arm 247 of relay 244 and the relay arm 229 of relay 226 are shown with their respective relay windings energized. When these windings are unenergized suitable biasing means (not shown) moves the arm 247 toward the right and the relay arm 229 toward the left in the figure.

The rudder amplifier 238 may be of the type disclosed in the aforesaid patent to Willis H. Gille et al. The illustration of this amplifier is simplified herein and has two amplifier relays 260, 261 which are operated in discriminator manner depending upon the phase relationship between the alternating voltage across power input terminals 239, 240 relative to the alternating voltage across signal input terminals 241, 242. Power terminals 239, 240 are connected to the ship's supply. The signal voltage provided across input terminals 241, 242 is obtained from a balanceable control network 262 having various signal generating devices.

Rudder amplifier control network 262 comprises a rudder balance network 263, a trim network 277, a turn rate-course deviation network 286, a yaw reset network 306, turn coordination potentiometer 180 of aileron network 157, direction reset network 187, and manual turn control network 200.

The rebalance network 263 comprises a left rudder balance potentiometer 264, a right rudder rebalance potentiometer 267, a rudder ratio potentiometer 270, a loading resistor 273, and a secondary winding 274 of the transformer. Potentiometer 264 has its resistor 265 connected across the ends of secondary winding 274, and its slider 266 driven through the operating connection 257 in accordance with the movements of the left rudder servomotor 221. Potentiometer 267 has its resistor 268 connected across the ends of secondary winding 274 and its slider 269 operated from the right rudder servomotor 216 through an operating connection 276. Ratio potentiometer 270 has a resistor 271 one end of which is connected to slider 266 and its other end connected in series with fixed resistor 273 to slider 269. Potentiometer 270 includes a manually adjustable tap 272 which is connected by a lead wire 275 to input terminal 241 of rudder amplifier 238.

Trim network 277 comprises a trim potentiometer 278 having its resistor 279 connected across the ends of a secondary winding 282 of the transformer and its slider 280 operatively driven by the rudder centering motor 320 through an operating connection 283. A lead wire 281 extends from slider 269 of network 263 to a center tap of secondary winding 282.

Network 286 comprises a turn rate potentiometer 287, a course deviation potentiometer 290, a rate coordination potentiometer 293, and a bomb coordination potentiometer 296, and a secondary winding 302 of the transformer. Potentiometer 287 has a resistor 288 connected across the ends of secondary winding 302 and a slider 289 positioned with respect to resistor 288 in accordance with the rate of turn of the aircraft. Potentiometer 290 has a resistor 291 connected across the ends of secondary winding 302 and a slider 292 positioned with respect to resistor 291 in accordance with deviations of the aircraft from a selected course. Rate coordination potentiometer 293 has a resistor 294 having one end connected to slider 289 and its other end connected to a center tap of secondary winding 302, and a manually adjustable tap 295. Bomb coordination potentiometer 296 has a resistor 297 having one end connected to the center tap of secondary winding 302 and its other end connected to slider 292 of potentiometer 290, and an adjustable tap 298. A lead wire 301 extends from slider 280 of network 277 to the tap 295 of the rate coordination potentiometer.

Slider 289 is positioned from a turn rate gyroscope 299 through a suitable operating connection 303, and slider 292 of potentiometer 290 is positioned from directional gyroscope 197 through an operating connection 176 in accordance with the deviations of the aircraft from a desired course. The rate gyroscope 299 is the restrained type and precesses about one of its axes of rotation an extent proportional to the rate of turn of the aircraft. The gyroscope may be similar to the turn indicator 38 disclosed in Patent 2,137,974 to Fischel.

Network 306 comprises a yaw reset potentiometer 307, a secondary winding 310 of the transformer, and a yaw ratio potentiometer 311. Potentiometer 307 has its resistor 308 connected across the ends of secondary winding 310, and a slider 309. Potentiometer 311 has its resistor 312 connected across a center tap of secondary winding 310 and the slider 309. Potentiometer 311 includes manually adjustable tap 313. A lead wire 314 extends from adjustable tap 298 of network 286 to the center tap of secondary winding 310. Slider 309 is driven from a yaw reset motor 317 through a suitable operating connection 315.

Potentiometer 180 as well as networks 187 and 200 have been described previously. A lead wire 316 extends from tap 313 of network 306 to tap 182 of potentiometer 180. Thus rudder amplifier 238 is provided with an input control circuit extending from amplifier ground lead 242 to ground lead 206 of network 157 and thence to network 200, 187, potentiometer 180, network 306, 286, 277, 263, and lead 275 to signal input terminal 241.

Rudder network centering motor 320 is similar to the other centering motors being of the permanent magnet field reversible energized armature type. The motor includes a permanent magnet field (not shown) and an armature 321 across which is connected a resistor 318 having a grounded center tap.

In order to control the yaw reset potentiometer 307 of network 306 and the direction reset potentiometer 188 of network 187, there is provided a reset signal generator 325. The reset signal generator 325 comprises a yaw reset potentiometer motor 317, yaw motor control relays 326 and 333 suitably cross connected, a yaw motor operated reset switch 340, and a yaw responsive motor operation initiation switch 344. Signal generator 325 includes a direction reset motor 350, motor control relays 355, 362 suitably cross connected, a motor operated reset switch 369; and a directional gyro operated motor operation initiation switch 374. Signal generator 325 includes a relay 380 which is manually controlled. Motor 317 is of the capacitor type induction motor having field windings 321, 322, phasing condenser 333 and an induction rotor 324. By means of the operating connection 315 motor 314 drives the slider 309 of potentiometer 307. Relay 326 is of the double pole single throw type with a single break contact on one pole and a single make contact on the other pole. Relay 326 includes an operating winding 327, a pull rod 328 and relay arms 329 and 330 which respectively coact with an out contact 331 and an in contact 332. Relay 333 is of a similar type to relay 326 and comprises an operating winding 334, a pull rod 335, relay arms 336, 337 which respectively coact with an out contact 338 and an in contact 339. Switch 340 is of the single pole double throw type wherein the pole may assume a position intermediate spaced contact. Switch 340 includes pole 341 having operating connection 315 from motor 314 and spaced contacts 342, 343. Switch 344 includes a single pole 345 and spaced contacts 346, 347. Like switch 340 the pole 345 of switch 344 may assume a position intermediate the spaced contacts 346, 347. The pole 345 is operated from a vane 348 during yaw of the aircraft or whenever the aircraft is not moving in the direction in which it is headed.

Motor 350 is also a capacitor type induction motor having field windings 351, 352; a phasing condenser 353; and an induction rotor 354. Relay 355 is of the type similar to relay 326 and includes an operating winding 356, a pull rod 357, relay arms 358 and 359 which coact respectively with out contact 360 and in contact 361. Relay 362 is similar to relay 355 having an operating winding 363. A pull rod 364, relay arms 365 and 366 which coact respectively with out contact 367 and in contact 368. Switch 369 is similar to switch 340 having a pole 370 which coacts with spaced contacts 371, 372. The pole 370 is operated from the motor 350 by a suitable operation connection 373. Switch 374 is of the same type as switch 369 having a single pole 375 which coacts with the spaced contacts 376, 377. The pole 375 is operatively driven from the directional gyroscope 197 through a suitable operating connection 378 and 176. Relay 380 is of the four pole single throw type having two break contacts and two make contacts. This relay includes an operating winding 381, pull rod 382, relay arms 383, 384, 385 and 386 which coact respectively with break contact 387, break contact 388, make contact 389 and make contact 390. Relay winding is controlled by a single pole, single throw manually operable switch 391.

*Operation*

The operation of the apparatus will be considered firstly when the control surfaces are being manually operated and secondly when the control surfaces are being automatically positioned. When the control surfaces are manually operated, the right elevon servo engage relay 16, the left elevon engage relay 56, and the rudder engage relays 250 and 232 are unenergized. Their respective relay arms assume the positions illustrated. At this time the control surfaces may be manually operated freely without restrictions since the respective servomotors are disengaged therefrom.

We may assume that in the various networks the several sliders are at the normal position on their respective resistors. Thus, in aileron network 157, sliders 168 and 179 of network 165 are at the electrical centers of their resistors 167 and 178. Similarly in the network 200 the slider 203 will be at the electrical center of its resistor 202 at which time the potential of slider 203 is the same as that of center tap lead 206. It is evident that if slider 203 be displaced in either direction from its electrical center that there will be a potential difference between slider 203 and lead 206 from which a signal voltage is obtained. It is believed apparent how such signal voltage from network 200 is applied across the voltage divider 207 and a selected portion, in accordance with the position of tap 211, is applied through network 86 to both the amplifier 30 which controls the right elevon servomotor and the amplifier 70 which controls the left elevon servomotor. The signal as applied to the amplifiers by network 200 will be of the same phase or polarity. Assuming as before that the individual networks are in balanced condition with their sliders at the normal position on their respective resistors as previously stated, if the pilot desires to change the trim of the aircraft about the roll axis he manually operates the elevons in opposite directions in accordance with the direction of tilt desired. This movement of the elevon control surfaces by manual operation adjusts the slider 137 of network 134 and slider 147 of network 144 by the respective follow up connections 143 and 155. When the craft has changed its trim as desired the control surfaces or elevons and sliders 137, 147 are moved back to their normal position.

The vertical gyro 102 senses the change in attitude of the aircraft about its roll axis and through its operating connection 104 displaces the slider 99 of up elevator network 87 and the slider 179 of network 165. The displacement of slider 99 introduces in elevator network 86 a signal voltage which by means of the voltage divider 129 is of oppoiste phase on amplifiers 30 and 70. The adjustment of slider 179 results also in a signal in aileron network 157 which is applied without phase reversal to amplifiers 30 and 70 through the cross connection 212 of networks 86 and 157.

Disregarding for the time being the signal from up elevator network 87 due to the displacement of slider 99, the signal from network 157 as stated is applied to elevon amplifiers 30 and 70. The right elevon amplifier 30 will operate one or the other of its relays 36 or 41 depending upon the phase relationship between the applied signal voltage across terminals 33, 34 with respect to the voltage from the source applied to terminals 31 and 32. Direct current may now be transmitted from battery 393 through the operated amplifier relay and through relay arms 19 or 20 to one or the other of the out contacts 22 or 24 of the engage relay 16 to the centering motor 26. The centering motor through its drive means 163 positions the slider 160 of the centering potentiometer 158.

Similarly the signal applied to the left elevon amplifier 70 causes the operation of one or the other of amplifier relays 76 or 81 and current is transmitted from battery 394 through the operated relay and one or the other of relay arms 59, 60 to one or the other of out contacts 62, 64 to the centering motor 66. The centering motor drives its shaft 113 which transmits its motion to the gear train 112. The output shaft 111 of the gear train rotates at a slower rate than the input shaft 113 and positions the slider 107 of the trim potentiometer 106.

Assuming that the signal from network 157 initially due to the displacement of slider 179 is of positive phase and no signal voltage is obtained from network 86 initially. The centering motor 26 will displace slider 160 of potentiometer 159 in an attempt to provide a negative signal which will balance the positive signal on the right elevon amplifier 30. This negative signal is also applied to the left elevon amplifier 70. The centering motor 66 on the other hand will position slider 107 in an attempt to provide a negative signal on its amplifier which will balance the positive signal obtained initially from network 157. This action of network 105 applies a positive signal on the amplifier 30. Thus while network 157 may be theoretically considered balanced with the centering potentiometer 159 compensating for the signal from gyro potentiometer 177 the potentiometer 106 as driven by the motor 66 will apply a signal in network 86. Thus the operation of potentiometer 106 will apply a voltage of negative character to amplifier 70 and a positive voltage to amplifier 30. The amplifier 30 would now cause the motor 26 to position slider 160 of potentiometer 159 to provide a negative signal to balance its positive signal.

If the speed at which slider 107 is driven is the same as that at which slider 160 is driven, it was found that as the aileron trim motor 26 positions slider 160 in an attempt to balance the input from network 157 to servo amplifier 30, the motor 66 in attempting to balance the input from network 157 to servo amplifier 70 by the operation of slider 107 throws the control signal on amplifier 30 from network 157 over the balance point and into the opposite phase which results in a reverse rotation of motor 26 and the reverse movement of slider 160. Similarly when centering motor 66 attempts to provide a signal in network 86 which balances the input from network 86 on amplifier 70 which input signal from network 86 on amplifier 70 is of opposite phase from that applied on amplifier 30 the motor 26 drives the slider 160 of potentiometer 159 to supply a signal in network 86 from network 157 which throws the balance signal on amplifier 70 from network 86 over to the opposite phase resulting in a reverse direction of rotation of motor 66. The motor 26 and the motor 66 thus drive their respective sliders 160 and 107 about a balance point and a hunting condition is developed.

It was found that by providing the gear train 112 in addition to the regular gear train normally present in the motors to further reduce the speed at which slider 107 is moved this hunting about the balance point will be prevented. It is believed that the manner in which this operation is obtained may be made clear by considering an extreme case. For example if networks 86 and 157 are in balanced condition and subsequently an unbalance signal is obtained from network 165 in the aileron action network 157 this unbalance signal is applied as stated to amplifiers 30 and 70. If the speed of rotation of motor 26 is made high in comparison with the speed of motor 66 it is apparent that slider 160 may be adjusted to balance the network 157 before the slider 107 will have been displaced by motor 66. Thus a balance is immediately obtained and no hunting is incurred.

As far as rudder network centering is concerned, if an unbalance voltage appears in network 262 it is applied to rudder amplifier 238 which operates and closes one or the other of amplifier relays 260 or 261. Direct current is now transmitted from battery 395 through the closed relay to engage relay arms 235 or 253. The current is thence transmitted to either out contact 255 or 237 to the rudder centering motor 320. The rudder centering motor through its driving connection 283 positions slider 280 of network 277 to balance the control signal circuit to the rudder amplifier 238.

When it is desired to automatically control the aircraft the engage relays 16, 56, 232, and 250 are energized. At this time the single pole single throw manually operable switch 391 is in open position. In energized condition of the engage relays, the several amplifier relays are associated with the in contacts of the respective engage relays and thus with the windings of the servomotors. The directional gyroscope is released from its caged condition.

Should the craft tilt about the pitch or lateral axis the vertical gyro 102 will displace slider 90 with respect to resistor 89. A signal from network 86 is thus applied to the elevon amplifiers 30 and 70 which cause the right and left elevons to be operated in the same direction to return the craft to its original attitude.

If the craft tilts about the roll axis, slider 179 is displaced with respect to resistor 178 resulting in the generation of a signal in aileron action network 157 which is applied through the cross connection 212 and elevator action network 86 to the elevon amplifiers 30 and 70. In response to this signal the elevon amplifiers 30 and 70 cause the right elevon servo 10 and the left elevon servo 50 to rotate their control surfaces in opposite directions.

A signal as derived from the network 165 is by means of the potentiometer 180 and lead 316 applied through the network 262 to the rudder amplifier 238. The signal on the rudder amplifier causes one or the other of relays 216 or 261 to operate. Specifically, if we assume tilt to the right, and thus relay 261 to be operated, current is fed from the battery 395 through closed relay 261 in contact 254 of relay 250 and in contact 248 of relay 244 to winding 222 of the left rudder servo. The left rudder servo operates the left rudder toward open position at which time the switch 256 is opened automatically.

The right elevon servomotor 10 operates its rebalance potentiometer slider 137 through the operating connection 143 and the left elevon servomotor through its operating connection 155 operates slider 147 of potentiometer 145 to limit the displacement of the elevons. The left rudder servomotor 221 through its operating connection 257 positions slider 266 to balance network 262.

As the craft approaches level position vertical gyroscope 102 moves slider 179 toward its normal position with the decreased tilt. The right and left elevon servomotors now move in the opposite direction to lessen the amount of elevon displacement. As the craft reaches its normal position about the roll axis the elevons are centered.

The movement of slider 179 toward its normal position also unbalances rudder network 262 in the opposite direction resulting in the rudder amplifier 238 operating relay 260. Direct current is thus led from battery 395 through closed contacts of relay 260, relay arm 235, in contact 236 of the engage relay 232, relay arm 229, out contact 230 of relay 226 through the other winding 223 of the left rudder servomotor 221. The left rudder servomotor thus returns its operated rudder to unoperated position at which time the switch 256 is closed.

It will be evident that if the original signal due to tilt of aircraft was of opposite phase, the rudder amplifier 238 would close relay 260 which would result in the operation of the right rudder servomotor 216. Subsequently this rudder servomotor would be reversed to return its operated rudder to unoperated position. Thus but one rudder is displaced from unoperated position when changing from the operation of one motor to the other.

The operation of the yaw correcting mechanism and reset signal generator will be considered. If the aircraft is not headed in the direction of movement of the craft relative to the air the vane 348 will be angularly displaced. Vane 348 will move the switch pole 345. The actual space between contacts 346 and 347 is very small and a slight displacement of pole 345 will close a circuit. With the manually operable single pole single throw switch 391 in closed position, the relay 380 is energized to raise the respective relay arms. A circuit is now completed which comprises: battery 396, the relay arm 385, in relay contact 389, switch pole 345, contacts 346 or 347, one or the other of relay windings 327 or 334, lead 397, lead 400 and ground. Assuming pole 345 as operated by vane 348 engages contact 346 a circuit is evidently completed through winding 327 and leads 397, 400 to ground and return to battery 396.

Alternating current from the ship's supply may be led from conductor 398 to in contact 332 of relay 326 thence to relay arm 330 directly to winding 321 and to ground and alternatively through phasing condenser 323 through winding 322 to ground. The motor 317 thus rotates and positions the slider 309 of the yaw reset potentiometer and also through its connection 315 positions the switch arm 341 into engagement with contact 343.

The signal in network 306 due to the displacement of slider 309 causes the aircraft to change its heading so that it is aligned with the direction in which it is moving relative to the air.

This change in heading of the aircraft, due to the effect of the yaw reset network 306, causes the directional gyro 197 to position sliders 168 and 292 and also to operate switch arm 375 into engagement with contact 376 or contact 377. Assuming arm 375 engaged with contact 377 a circuit is completed from battery 396, relay arms 386, in contact 390, switch arm 375, contact 377, relay winding 363, leads 397, 400 to ground and to the ground of battery 396. Alternating current is now led from the ship's supply by lead 398, in contact 368, relay arm 366, lead 399, directly to winding 352 and by way of phasing condenser 353 to winding 351 thence through common lead 400 to ground and to the ground of the ship's supply.

The motor 350 thus rotates and through its operating connection 373 moves the arm 370 of switch 369 into engagement with contact 371. The motor also through its operating connection 401 positions slider 191 of the direction reset potentiometer 188.

The displacement of slider 191 from motor 350 introduces a signal in aileron and rudder networks 157 and 262 which causes the aircraft to make a banked turn so that it regains its original heading.

Simultaneously, as stated, with the change in heading of the aircraft due to the operation of the yaw reset potentiometer network 306 the directional gyroscope 197 had displaced the slider 168 of the directional gyro potentiometer 166 and the slider 292 of the potentiometer 290 to aid in correcting for the deviation.

The function of yaw reset network 306 and direction reset network 187 is to put in a sustained signal which will force the aircraft to fly without yaw and on its selected heading despite any factors which would permanently cause yaw or deviation from selected gyro heading.

It may be desirable to return the slider 309 of potentiometer 307 in yaw network 306 and slider 191 of potentiometer 188 in direction reset network 187 to their normal position on their respective resistors. To this purpose the manually operable switch 391 is moved to open position at which time the relay 380 is deenergized.

With relay 380 deenergized, direct current is led from battery 396, relay arm 384, out contact 388, switch arm 341, contact 343, relay winding 334, lead 397, lead 400, to ground and to ground of battery 396 operating relay 333. Alternating current is now led from lead 398, in contact 339 of relay 333, relay arm 337, directly through winding 322 of motor 317 and through phasing condenser 323 and winding 321 to ground and to the ground of the ship's supply. Motor 317 as thus energized drives the slider 307 to its normal position on resistor 308 and also through the operating means 315 drives the switch arm 341 to its normal position thereby opening the circuit to relay winding 334.

With the switch arm 341 in its normal position, direct current is led from battery 396, lead 403, out contact 338 of relay 333, relay arm 336, out contact 331 of relay 326, relay arm 329, to winding 321 of motor 317. Winding 321 as now energized from the direct current source 396 applies a retarding or "slugging" effect to the rotor 324 to hinder its rotation beyond its normal position.

Similarly direct current is led from battery 396, relay arm 383, out contact 387, switch arm 370, contact 371, relay winding 356, lead 397, lead 400, to ground and to the ground of battery 396 energizing coil 356. Alternating current is then led from lead 398, in contact 361 of relay 355, relay arm 359, directly to winding 351, and alternatively through phase condenser 353 and winding 352, thence through common lead 400 to ground and the ground of the ship's supply. Motor 350 therefore reverses its rotation and through its operating connection 373 returns the switch pole 370 to its normal position opening the circuit of coil 356. Direct current is now led from battery 396, lead 403, out contact 360 of relay 355, relay arm 358, out contact 367, relay arm 365, lead 399, to winding 352 of motor 350 and through lead 400 to ground and to battery ground. The direct current applied to winding 352 exerts a retarding effect on rotor 354 to hinder its displacement beyond its normal position.

It is now evident that there has been provided a novel centering or balancing arrangement for the control networks, which supply signals for controlling the operation of the control surface servomotor, which functions during manual operation of such control surfaces to provide changes in attitude of the craft. It is further evident that there has been provided a novel reset signal generator which operates control elements associated with these networks. It is further evident that there has been provided a novel arrangement for sequentially operating two rudder servomotors during automatic control of such surfaces.

While one embodiment of the invention has been disclosed, it may be apparent from a consideration thereof by those skilled in the art that other forms of the invention will be suggested. It is therefore desired not to limit the invention to the preferred embodiment but as defined by the appended claims.

I claim as my invention:

1. In control apparatus for an aircraft having a first set of two control surfaces for positioning said craft about the turn axis of said craft and a second set of two control surfaces for positioning said craft about its roll and pitch axes, in combination: first servo means operating said first surfaces, second servo means comprising two motors each operating one of said second surfaces, a first amplifier means controlling said first servo means, a second amplifier means including two control terminal amplifiers controlling said second servo means whereby each said motor is controlled solely by one amplifier, a first balanceable network having two output terminals, a second network having a pair of output terminals one being connected to an electrical center of the first network and the other to both of said two amplifiers and each output terminal of the first network being connected to a corresponding terminal of the two amplifiers, a third balanceable network, course responsive means controlling the balance of the second and third networks and thus both amplifier means for causing operation of one of said first surfaces, and opposite operation of both of said second surfaces to place said craft in a banked turn, attitude responsive means responsive to bank of said craft controlling the balance of the first network to cause operation of said second control surfaces in the same direction, motor operated means in each network wherein said means in the first and second networks are operated at different rates for changing the attitudes at which said responsive means maintains said craft, and means alternatively controlling said motor means instead of said servo means from said amplifier means during manual operation of said control surfaces to condition said responsive means for automatic control.

2. Control apparatus for an aircraft comprising: a two phase motor adapted to control the position of the craft about one of its axes; a device responsive to a condition of said craft altered by a change in said position; a switch operated by said device; first relay means energized by said operated switch and moved to its operated position for energizing said motor, a motor normal position controlling reset switch operated by said motor, manually operable means for deenergizing said first relay, second relay means energized by said operated reset switch and connected to the manually operable means and effective on deenergizing of said first relay to effect reverse rotation of said motor to its normal position, and further means connected to both relays and effective on deenergization of said second relay on movement of said reset switch to unoperated position by said motor for applying direct current to one phase of said motor to impede further rotation thereof.

3. Control apparatus for an aircraft having two voltage responsive means each having an individual servomotor respectively controlled by one of said voltage responsive means for operating control surfaces in the same or opposite directions, said apparatus comprising: a first reversible polarity balanceable voltage signal network connected in phase opposition to both voltage responsive means for directly controlling said both voltage responsive means and thus said servomotors whereby said control surfaces are moved in the same direction; a second reversible polarity balanceable voltage signal network for controlling both said voltage responsive means and thus said servomotors and connected in parallel thereto through said first network whereby said control surfaces are moved in opposite directions; a motor means; a first two position switching means; for controlling alternatively one servomotor or said motor means by one of said voltage responsive means and said motor means having an output connection for balancing said first network; a second motor means; a second two position switching means alternatively controlling said other servomotor or second motor means by the other of said voltage responsive means and second motor means having an output connection for rebalancing said second network, and speed reducing means between the first motor means and its output connection, said first motor means connection is operated at a lower rate than said second motor means connection whereby the interconnected networks may be balanced prior to the application of servomotor control.

4. In control apparatus for an aircraft: two signal responsive means, two servomotors one controlled by one of said signal responsive means, the other by the second signal responsive means for operating control surfaces of said craft; a first and a second balanceable signal-providing circuit one connected in push-pull the other connected in parallel to said responsive means for jointly controlling both said two-signal responsive means whereby one signal-providing circuit effects operation of said control surfaces in the same direction and the other signal providing circuit effects operation of said control surfaces in opposite directions; two motor control switching means; a separate motor means for each responsive means; a motor means and servomotor alternatively controlled through one switching means by each signal responsive means so that each said signal responsive means simultaneously controls a motor means for rebalancing a signal-providing circuit from one motor means, means for effecting rebalance of one of the circuits through one motor means at a higher rate than the rebalance of the other circuit by the other motor means whereby rebalance of one circuit at the higher rate will substantially prevent unbalance of said other circuit by its motor means.

5. Control apparatus for an aircraft having two control surfaces, said apparatus comprising two servomotors, each surface solely operated by one servomotor; an individual amplifier, having only two input terminals, for each servomotor for reversibly controlling its operation; means comprising a signal generator having an operator movable to one position in one direction and connected in push-pull relation to both amplifiers for providing a signal of opposite polarity to both amplifiers to effect operation of said control surfaces in the same direction; means including a second signal generator movable by said operator during displacement thereof in a direction at an angle to said first direction to one position and connected in parallel to both amplifiers for providing a signal of like polarity to both amplifiers to effect operation of said control surfaces in opposite directions; means connected to one signal generator and controlled alternatively with one servomotor by one amplifier to provide a compensating signal in one signal generator; means connected to the other signal generator and controlled alternatively with the other servomotor by the other amplifier to provide a compensating signal in the other signal generator whereby both signal generators are maintained in no signal condition while said servomotors are not controlled from said amplifiers.

6. In an aircraft having two attitude control means operable in the same or opposite manner and which may be manually positioned or automatically positioned by individual servo means, in combination; a separate voltage responsive means for each servo means with each responsive means having a pair of elements alternatively operable in accordance with the phase of a control signal voltage, for controlling the direction of operation of each said servo means; first selective means for connecting each said voltage responsive means to its said servo means; attitude mean for producing signal voltages in response to tilt about two respectively perpendicular axes; a separate motor means connectable alternatively to a servomotor with each voltage responsive means for producing signal voltages, for determining the attitude about two axes to be maintained subsequently by said attitude means during automatic control; means connected to both voltage responsive means for combining said signal voltages but oppositely phasing one tilt signal effect but paralleling the other tilt signal effect to the two voltage responsive means, whereby said attitude control means may be operated in the same manner or in opposite manners to maintain the predetermined attitude of said craft about the two axes; second selective means connecting a motor means to a voltage responsive means for controlling both said motor means from said voltage responsive means during manual positioning of said attitude control means and means for causing said two motor means to have different displacement time ratios to produce relatively unequal signals while connected to the voltage responsive means.

7. Control apparatus for an aircraft having two control surfaces operable alternatively in the same or opposite directions for controlling the attitude of the craft about two horizontal axes thereof comprising: attitude means responsive to movement of the craft about either axis including a pair of balanceable electrical voltage networks each having a pair of voltage signal providing output terminals with a first terminal of one network connected to an electrical voltage midpoint of the other network, one network being unbalanced by movement about one axis the other network being unbalanced by movement about the other axis, two servo means one being connected to a first terminal of the other network and the remaining terminal of the one network and the other servo means being connected to the second terminal of the other network and the said remaining terminal of the one network with both servo means thus responsive to said attitude means and on movement of said craft about one axis adapted to move said surfaces in the same direction and adapted on movement of said craft about the other axis to move said surfaces in opposite directions, further means in each network operatively connected to said attitude means but operated at relatively different total displacement time ratios for varying the attitude at which said attitude means and said servo means maintain said craft about each axis, and means for disconnecting said servo means from said attitude means and alternatively connecting said further means therewith, to shift response to said attitude means from said servo means to said further means.

8. Control apparatus for an aircraft having a pair of rudders for positioning said craft about its turn axis comprising: an individual servomotor for operating each rudder, an amplifier, a pair of control circuits for each servomotor connected between said amplifier and each servomotor for reversely controlling each servomotor; a balanceable voltage network operating said amplifier, two switching means in said control circuits each having two effective positions with one switch means connected to a first circuit of each pair of control circuits and the remaining switch means connected to the remaining circuit of each pair of control circuits, each switching means being individually operated by each of said servomotors during movement of its rudder to a normal position to effect sequential operation of said servomotors by said amplifier on continued unbalance of said amplifier network in the same direction, side slip detecting means responsive to departure of the heading of said craft from the direction of motion of the craft relative to the air, additional means operated thereby for unbalancing said network, means for rendering said side slip means ineffective on said additional means, motor means operable alternatively with said servomotors by said amplifier to rebalance said network, and further motor means postioned with said additional means for operating said additional means to non-unbalancing position.

9. Control apparatus for an aircraft comprising: a servomotor adapted to control the position of said craft about one of its axes; signal responsive control means operating said servomotor; a device responsive to a change in condition of said craft; switch means operated by said device, circuit means including a first relay energized by operation of said switch means, relay contacts closed on energization of said relay, a two phase induction motor operable from a normal position and energized through said closed relay contacts, signal providing means connected to said signal responsive control means and operated by said induction motor, a motor reset switch closed by operation of said induction motor from its normal position, manually operable means in said circuit means for deenergizing said relay, and means comprising a second relay energized by said closed motor reset switch and connected to the manually operable means and effective on deenergization of said first relay to effect reverse rotation of said motor, and further means connected to both relays effective on deenergization of the second relay on opening of said reset switch on return of said motor to normal position to apply a braking current to one phase winding of said motor.

10. Control apparatus for an aircraft having two control surfaces comprising: two servomotors each one adapted to operate one of said surfaces; two signal voltage responsive means each solely controlling operation of one servomotor the direction of operation depending on the phase of a voltage signal applied to the voltage responsive means; attitude means for providing voltage signals in accordance with tilt about two axes; means for combining said voltage signals and connected to both said voltage responsive means; further means in said combining means to oppositely phase one tilt signal to the two voltage responsive means, whereby upon tilt about one axis said servomotors operate the control surfaces in opposite directions and upon tilt about said second axis said control surfaces are operated in the same direction; a moveable motor means controlled alternatively with one servomotor by one said voltage responsive means for varying the attitude-maintaining characteristics of said attitude means about one axis; a second moveable motor means controlled alternatively with the other servomotor by said second voltage responsive means for varying the attitude maintaining characteristics of said attitude means about said second axis; means for transferring control by both said voltage responsive means from said servomotors to both motor means during manual operation of said surfaces; and means for obtaining relatively unequal rates of movements of said motor means while controlled from their respective voltage responsive means.

References Cited in the file of this patent
UNITED STATES PATENTS

| | | |
|---|---|---|
| 2,417,821 | Hardum et al. | Mar. 25, 1947 |
| 2,462,081 | Esval | Feb. 22, 1949 |
| 2,505,961 | Hansen et al. | May 2, 1950 |
| 2,558,096 | Markusen | June 26, 1951 |
| 2,570,905 | Young et al. | Oct. 9, 1951 |
| 2,634,391 | Rusler | Apr. 7, 1953 |
| 2,634,925 | Kutzler | Apr. 14, 1953 |

UNITED STATES PATENT OFFICE

CERTIFICATE OF CORRECTION

Patent No. 2,756,010                                                    July 24, 1956

Robert J. Kutzler

It is hereby certified that error appears in the printed specification of the above numbered patent requiring correction and that the said Letters Patent should read as corrected below.

Column 15, line 47, for "and means alternatively" read -- and switching means for alternatively --; column 16, line 15, before "second" insert -- said --; column 17, line 6, for "mean" read -- means --; column 18, line 10, after "position" and before the period insert -- when said side slip means is made ineffective on said additional means --.

Signed and sealed this 24th day of December 1957.

(SEAL)
Attest:
KARL H. AXLINE

Attesting Officer

ROBERT C. WATSON
Commissioner of Patents